(12) United States Patent
Woods

(10) Patent No.: US 7,895,719 B2
(45) Date of Patent: Mar. 1, 2011

(54) LOCKING SNAP BUCKLE

(76) Inventor: Michael E. Woods, Tiburon, CA (US)

( * ) Notice: Subject to any disclaimer, the term of this patent is extended or adjusted under 35 U.S.C. 154(b) by 933 days.

(21) Appl. No.: 11/695,272

(22) Filed: Apr. 2, 2007

(65) Prior Publication Data
US 2007/0226964 A1    Oct. 4, 2007

Related U.S. Application Data

(63) Continuation-in-part of application No. 11/309,848, filed on Oct. 12, 2006, now abandoned.

(60) Provisional application No. 60/767,482, filed on Apr. 1, 2006.

(51) Int. Cl.
*A44B 11/25* (2006.01)

(52) U.S. Cl. ............................................. 24/625; 24/615

(58) Field of Classification Search .................... 24/625, 24/614, 615; 70/18, 58
See application file for complete search history.

(56) References Cited

U.S. PATENT DOCUMENTS

| 5,224,247 | A | * | 7/1993 | Collier ..................... 24/587.12 |
| 5,669,253 | A | * | 9/1997 | Higgins .......................... 70/18 |
| 6,219,889 | B1 | * | 4/2001 | Lovato et al. .............. 24/587.1 |
| 6,510,717 | B1 | * | 1/2003 | Levi ............................... 70/18 |
| 2005/0055810 | A1 | * | 3/2005 | Loughlin et al. .............. 24/615 |

* cited by examiner

*Primary Examiner*—Robert J Sandy
(74) *Attorney, Agent, or Firm*—Michael E. Woods

(57) ABSTRACT

The security buckle includes a first body member having one or more walls defining a receiving cavity and one or more mating slots; and a second body member adapted to engage the receiving cavity, the second body member including one or more latching tabs for engaging the one or more mating slots wherein the second body member is inhibited from disengagement while the one or more latching tabs engage the one or more mating slots, and wherein the first body member includes a portion of the one or more walls defining a security slot adapted for receiving an interfering object that includes an engagement mode for insertion and removal from the slot and an interfering mode for inhibiting the one or more latching tabs from disengaging from the one or more mating tabs until the interfering object is transitioned to the engagement mode.

5 Claims, 6 Drawing Sheets

LOCKING SNAP BUCKLE

BACKGROUND OF THE INVENTION

The present invention relates generally to snap buckles as well as to systems and methods employing such snap buckles, and more specifically it relates to configuration of specially adapted snap buckles for implementation into anti-theft and theft-deterrent systems and methods.

FIG. 1 is a representative plan view of one style of a generic conventional snap buckle 100. Buckle 100 includes a first body member 105 that mates to a second body member 110 using a pair of latching tabs 115 of member 105 to engage mating complementary mating slots 120 of member 110. Member 105 and member 110 each include strap mounting slots 125 for attaching straps (not shown) in any number of conventional arrangements. A central guiding post 130 is usually included in some fashion as an aid in insertion of latching tabs 115 into member 110. Latching tabs 115 are springingly biased into the latching position so that latching tabs 115 may "squeeze" together during insertion yet positively latch into mating slots 120 to maintain member 105 in engagement with member 110 as long as latching tabs 115 engage mating slots 120. To disengage member 105 from member 110, latching tabs 115 are depressed towards each other (e.g., "squeezed") to disengage from mating slots 120 and to permit a user to retract member 105 from member 110.

There are many different configurations and arrangements for snap buckle 100 including use in backpacks, bags, pet collars and with other objects including solutions wherein it is desirable to mate two strap ends together. There are some configurations including a single latching tab engaging a single mating slot but otherwise the latching principle is the same. Conventional systems are configured for simple engagement and disengagement and are not generally contemplated to be part of a security system for enhancing anti-theft or theft-deterrence of the objects or of the "contents" of the object (such as the contents of the backpack or bag or of the pet).

Most current snaps are not configured to resist tampering or destruction as they predominately address ease of engagement/disengagement and latching persistence until a user positively desires to disengage. Similarly the straps themselves and any other objects to which these straps are affixed are not generally configured with anti-theft/security systems in mind. The buckles, straps, bags may be torqued, pulled, compressed, and otherwise manipulated to disengage or defeat the latching function or in the case of a backpack or bag having an opening with content ingress/egress control influenced by the strap/buckle (e.g., a fabric fold over the opening secured with the buckle affixed to straps on the bag and flap) access to the contents may be possible even with the buckle components engaged.

What is needed is a buckle system configured for implementation into anti-theft and theft-deterrent systems and methods.

BRIEF SUMMARY OF THE INVENTION

Disclosed is a security buckle and method and systems and methods employing the security buckle and methods. The security buckle a first body member having one or more walls defining a receiving cavity and one or more mating slots; and a second body member adapted to engage the receiving cavity, the second body member including one or more latching tabs for engaging the one or more mating slots wherein the second body member is inhibited from disengagement while the one or more latching tabs engage the one or more mating slots, and wherein the first body member includes a portion of the one or more walls defining a security slot adapted for receiving an interfering object that includes an engagement mode for insertion and removal from the slot and an interfering mode for inhibiting the one or more latching tabs from disengaging from the one or more mating tabs until the interfering object is transitioned to the engagement mode. Methods include coupling two buckle components together by engaging latching tabs of a security buckle into complementary mating slots/apertures and to inhibit decoupling by interfering with disengagement of the latching tabs. Systems and methods of using this security buckle and securing method include pet and container security systems and methods.

The components, subsystems, and systems and methods describe a security buckle and security systems and methods that may be simply and efficiently implemented into anti-theft and theft-deterrent systems and methods.

DETAILED DESCRIPTION OF THE INVENTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 2:
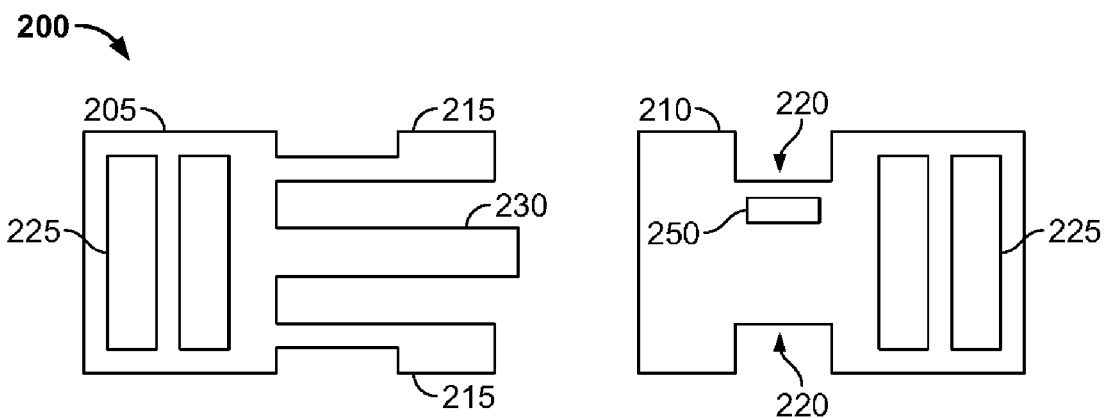
FIG. 2 is a representative plan view of a first aspect of the present invention incorporated into a two-piece lanyard release snap buckle.

FIG. 2 is a representative plan view of a first aspect of the present invention incorporated into a two-piece lanyard release snap buckle 200. Buckle 200 includes a first body member 205 that mates to a second body member 210 using a pair of latching tabs 215 of member 205 to engage complementary mating slots 220 of member 210. Member 205 and member 210 may each include strap mounting slots 225 for attaching straps (not shown) in any number of conventional arrangements. A central guiding post 230 may optionally be included in some fashion as an aid in insertion of latching tabs 215 into member 210. Latching tabs 215 are springingly biased into the latching position so that latching tabs 215 may "squeeze" together during insertion yet positively latch into mating slots 220 to maintain member 205 in engagement with member 210 as long as latching tabs 215 engage mating slots 220. To disengage member 205 from member 210, latching tabs 215 are depressed towards each other (e.g., "squeezed") to disengage from mating slots 220 and to permit a user to retract member 205 from member 210. Additionally, member 210 is provided with a security slot 250 sized to receive an interfering object (not shown) that extends into member 210 proximate one of latching tabs 215 (e.g., between one of tabs 215 and post 230. The interfering object is adapted to transition between two modes—the first mode permits engagement/disengagement with security slot 250 and the second mode resists disengagement and also concurrently inhibits transition of the one latching tab 215 into the 'unlatched' position. Thus while the interfering object is engaged through security slot 250 and in the second mode, the one latching tab 215 remains latched and member 205 may not be disengaged from member 210 absent damage or destruction of one of the components or portions thereof.

The design and construction of member 205 and 210 is adapted to resist damage and destruction that could permit disengagement of member 205 from member 210. The materials selected and design configuration and interactions are adapted to not be easily deformed, damaged, or destroyed. While virtually no system is destruction-proof, emphasizing materials and design to resist reasonable (within constraints and design parameters of the particular application) torquing, crushing, pulling, compressive, tension, and/or shearing forces enhances security up to the design limits. For example, special crush and tear-resistant plastics may be used in the construction. An additional concern for enhancing security could be addition of composites or fibers to prevent deformation and damage to slot 250 and thereby inhibit premature removal of the interfering object.

While it is contemplated that there may be many different types and configurations of acceptable interfering objects, with slot 250 adapted appropriately, a preferred embodiment is use of a MicroSaver® security solution provided by Kensington Technology Group, 333 Twin Dolphin Drive, Sixth Floor, Redwood Shores, Calif. 94065, or equivalent (details regarding the MicroSaver® security solutions and locks are hereby expressly incorporated by reference for all purposes). This security solution provides a rotatable T-bar that may be used as the interfering object when slot 250 is about three millimeters wide and about seven millimeters long. The MicroSaver® security solution includes two modes for the T-bar with a locking system cooperating with the T-Bar to secure the T-Bar into these modes. A security cable is coupled to the locking system and may thus be used in some embodiments of further localizing a locked buckle 200 to a second object by coupling the security cable to the second object and using the locking system to secure the T-bar into the second mode while it engages slot 250 (physical localization may be achieved by this leashing aspect of constraining movement between the second object and the buckle by the cable or other localization systems like motion/alarm system or RFID tags and sensors and the like). This is described in more detail below but the interfering object may be used without the security cable when localization is not required or desired or used with the security cable when localization is required or desired.

The Kensington security slot has become a standard security feature provided in the exterior walls of many electronic and portable devices, such as laptops, personal computers, personal digital assistants (PDAs), and the like. For security systems and products, design and implementation of appropriate security slots is well-known and adaptation of this security slot for the present invention is well within the skills of a person of ordinary skill in the art. Kensington publishes information on slot specification and use at: http://us.kensington.com/html/1356.html, this information is hereby expressly incorporated by reference in its entirety for all purposes. The information includes information on clearances and requirements, for example, among other details. In some cases, the standard includes use of a metal backing behind slot 250 to enhance retention of a MicroSaver® locking system to slot 250. Of course, other interfering objects may also be employed in satisfactory manner and are within the scope of the present invention.

A further design configuration of a security system using buckle 200 is, when configured for use with straps, is to provide the straps to also resist detaching or destruction by torquing, shearing, compressing, and/or tension forces. For example, use of tear and cut-resistant Kevlar fibers in the straps or the like and secure coupling of the straps to slot engagement slots 225 may be appropriate. Note that in some systems, buckle 200 may be employed in a security using a coupling system that does not include straps and the coupler mechanism 225 would be adapted or removed as appropriate.

Figure 1:
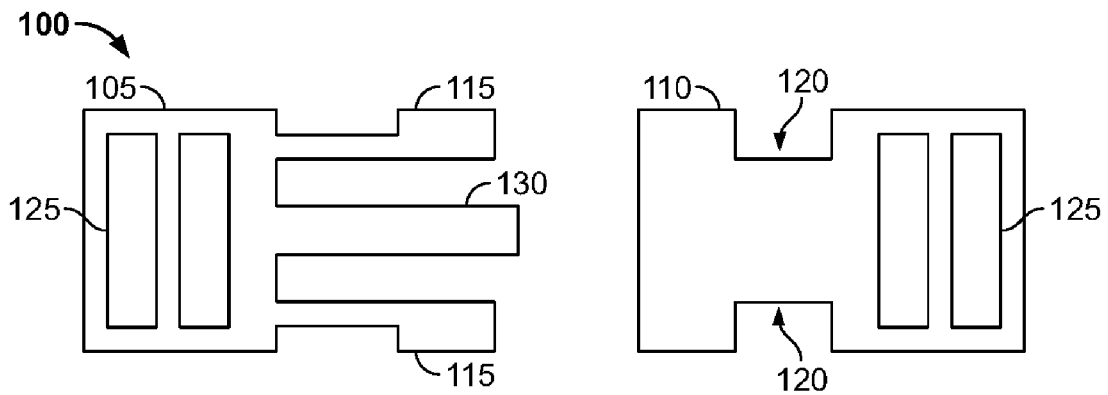
FIG. 1 is a representative plan view of one style of a generic conventional snap buckle.
Figure 3:
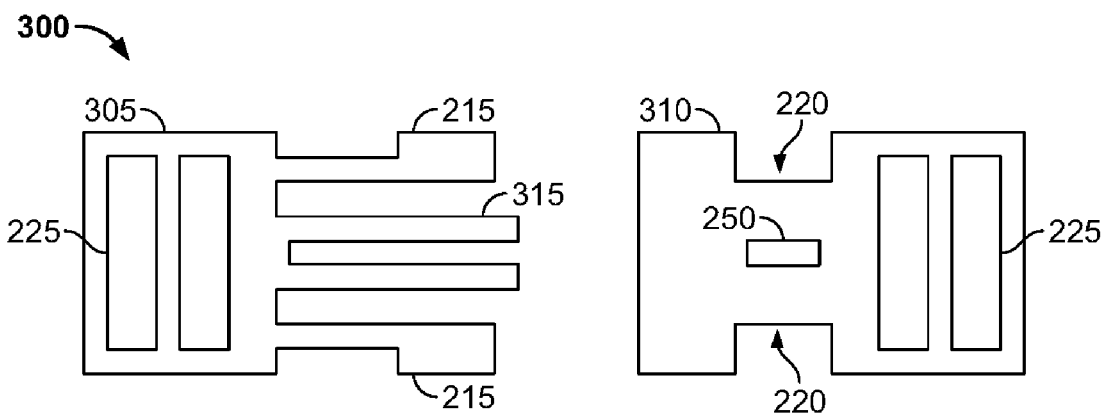
FIG. 3 is a representative plan view of a second aspect of the present invention incorporated into a two-piece lanyard release snap buckle.

FIG. 3 is a representative plan view of a second aspect of the present invention incorporated into a two-piece lanyard release snap buckle 300. Buckle 300 includes a first body member 305 that mates to a second body member 310 using a pair of latching tabs 215 of member 305 to engage complementary mating slots 220 of member 310. Member 305 and member 310 are similar to member 205 and member 205, respectively, described above regarding FIG. 1 but modified as described later. Member 305 and member 310 may each include strap mounting slots 225 for attaching straps (not shown) in any number of conventional arrangements. A central guiding post 315 is included as an aid in insertion of latching tabs 215 into member 310 and also to retain latching tabs 215 in the latched position. Latching tabs 215 are springingly biased into the latching position so that latching tabs 215 may "squeeze" together during insertion yet positively latch into mating slots 220 to maintain member 305 in engagement with member 310 as long as latching tabs 215 engage mating slots 220. To disengage member 305 from member 310, latching tabs 215 are depressed towards each other (e.g., "squeezed") to disengage from mating slots 220 and to permit a user to retract member 305 from member 310. Additionally, member 310 is provided with security slot 250 as discussed above but positioned for a slightly different function.

Post 315 is a fork having a pair of tines and slot 250 is positioned so that the interfering object (not shown) may be inserted between the tines. The interfering object in this configuration transitions the tines of post 315 between a first mode (as shown in FIG. 2) and to a second mode that spreads the tines and inhibits transition of latching tabs 215 from disengagement from mating slots 220. The interfering object in this aspect indirectly interferes with latching tabs 215 in contrast to direct interference with one or more of latching tabs 215 as shown in FIG. 2. As previously discussed, the interfering object is adapted to transition between two modes—the first mode permits engagement/disengagement with security slot 250 and the second mode resists disengagement and also concurrently inhibits transition of latching tabs 215 into the 'unlatched' position by the interactions of the interfering object and the tines of post 315. Thus while the interfering object is engaged through security slot 250 and in the second mode, the latching tabs 215 remains latched and member 305 may not be disengaged from member 310 absent damage or destruction of one of the components or portions thereof. In other respects, buckle 300 and the types of interfering objects are as described above in the discussion of FIG. 2.

Figure 4:
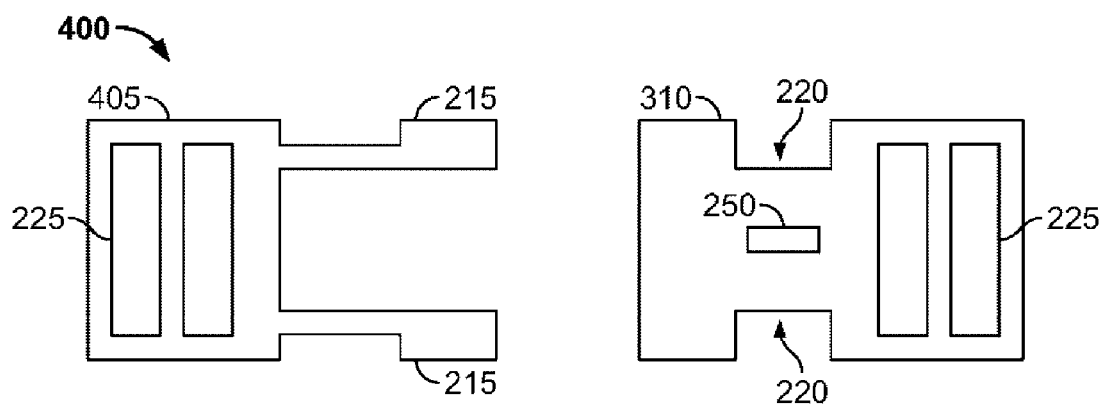
FIG. 4 is a representative plan view of a third aspect of the present invention incorporated into a two-piece lanyard release snap buckle.

FIG. 4 is a representative plan view of a third aspect of the present invention incorporated into a two-piece lanyard release snap buckle 400. Buckle 400 includes a first body member 405 that mates to a second body member 310 using a pair of latching tabs 215 of member 405 to engage complementary mating slots 220 of member 310. Member 405 is similar to member 205 and member 305 described above in connection with FIG. 2 and FIG. 3. Member 310 is also described above in FIG. 3. Member 405 and member 310 may each include strap mounting slots 225 for attaching straps (not shown) in any number of conventional arrangements. The central guiding post (e.g., post 215 and post 315) are omitted from body 405, however some stub of this post may be provided when the function is structural and not just for guiding. Latching tabs 215 are springingly biased into the latching position so that latching tabs 215 may "squeeze" together during insertion yet positively latch into mating slots 220 to maintain member 405 in engagement with member 310 as long as latching tabs 215 engage mating slots 220. To disengage member 405 from member 310, latching tabs 215 are depressed towards each other (e.g., "squeezed") to disengage from mating slots 220 and to permit a user to retract member 405 from member 310. Additionally, member 310 is provided with security slot 250 as discussed above in FIG. 3.

With the central guiding post removed (or shortened—not shown), the interfering object in this configuration transitions directly interferes with latching tabs 215 in contrast to the indirect interference with one or more of latching tabs 215 as shown in FIG. 3. As previously discussed, the interfering object is adapted to transition between two modes—the first mode permits engagement/disengagement with security slot 250 and the second mode resists disengagement and also concurrently inhibits transition of latching tabs 215 into the 'unlatched' position by the interactions of the interfering object proximate to latching tabs 215. Thus while the interfering object is engaged through security slot 250 and in the second mode, the latching tabs 215 remains latched and member 305 may not be disengaged from member 310 absent damage or destruction of one of the components or portions thereof. In other respects, buckle 400 and the types of interfering objects are as described above in the discussion of FIG. 2 and FIG. 3.

Figure 5:
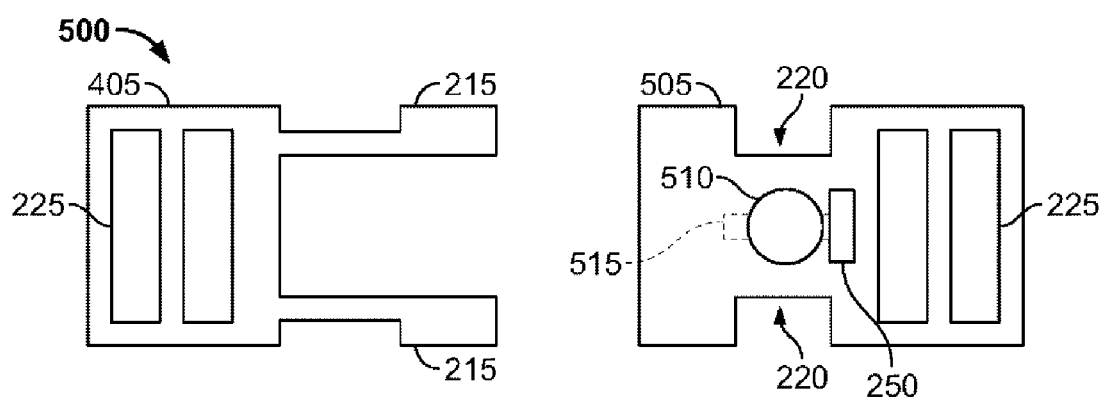
FIG. 5 is a representative plan view of a fourth aspect of the present invention incorporated into a two-piece lanyard release snap buckle.

FIG. 5 is a representative plan view of a fourth aspect of the present invention incorporated into a two-piece lanyard release snap buckle 500. Buckle 500 includes first body member 405 as shown in FIG. 4 above that mates to a second body member 505 using a pair of latching tabs 215 of member 405 to engage complementary mating slots 220 of member 505. Member 505 is similar to member 210 and member 310 described above in connection with FIG. 2, FIG. 3, and FIG. 4. Member 405 and member 505 may each include strap mounting slots 225 for attaching straps (not shown) in any number of conventional arrangements. Latching tabs 215 are springingly biased into the latching position so that latching tabs 215 may "squeeze" together during insertion yet positively latch into mating slots 220 to maintain member 405 in engagement with member 505 as long as latching tabs 215 engage mating slots 220. To disengage member 405 from member 505, latching tabs 215 are depressed towards each other (e.g., "squeezed") to disengage from mating slots 220 and to permit a user to retract member 405 from member 505.

Member 505 differs from member 210 and 310 in several ways including integration of a lock 510 incorporating interfering member 515. In this embodiment, lock 510 may include a "dial" configuration so that movement of an exterior portion (e.g., rotation) rotates interfering member 515 to inhibit latching tabs 215 when in the second mode as described above. (The modes are similar to described above except in this embodiment the interfering object is not inserted and/or removed as it is integrated into member 505.) That is, when lock 510 positions interfering object 515 into the first mode, latching tabs 215 may be depressed together for unlatching as interfering member 515 is in the first mode and does inhibit the unlatching. When the lock positions interfering object 515 into the second mode, latching tabs 215 may not be depressed and member 405 is secured to member 505. In some instances, it may still be desirable to employ a locking and/or localizing feature in which case security slot 250 may also be included. Advantageously, should dimensions of lock 510 and other arrangement permit, providing for the T-bar of the MicroSaver® lock to interfere with interfering member 515 is one way to achieve positive keyed/combination locking with localization (e.g., the security cable). The T-bar in one position is inserted/removed from slot 250 and in the other position it resists removal and prevents transition of interfering member 515 back to the first mode. In other respects, buckle 500 and the types of interfering objects are as described above in the discussion of FIG. 2, FIG. 3, and FIG. 4.

While the interfering member has been described above as an anti-theft system, use of an interfering object may also serve in some instances as a control to enhance positive latching and to prevent inadvertent unlatching. In this case, the interfering member may not include a locking system to positively inhibit transition of the interfering member from the second mode back to the first absent key or combination but serves more as a simple detent that must be transitioned before unlatching occurs.

Figure 6:
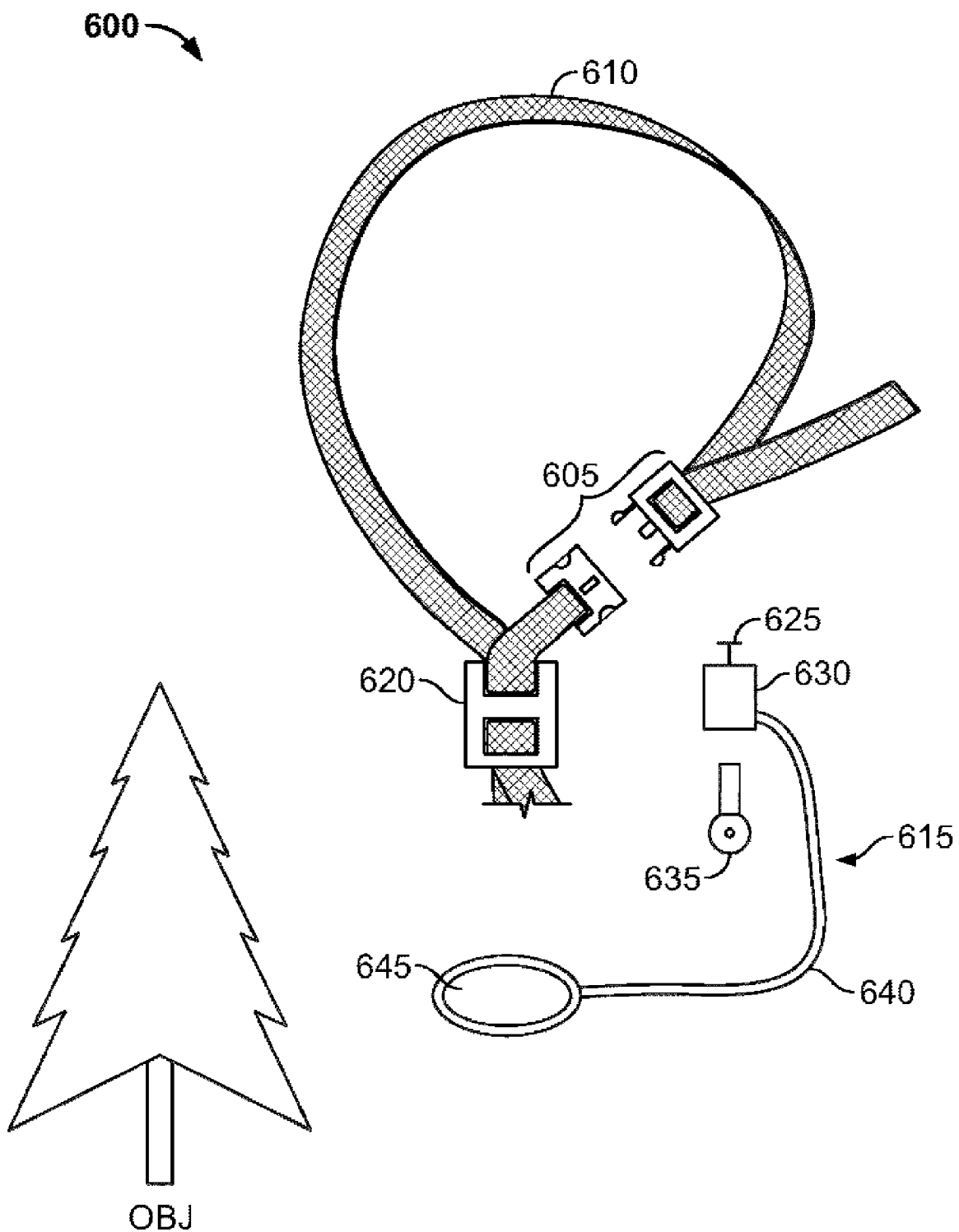
FIG. 6 is a representative plan view of a first aspect of the present invention incorporated into a security system.

FIG. 6 is a representative plan view of a first aspect of the present invention incorporated into a security system 600. System 600 includes a security buckle 605 coupled to a securing subsystem 610 (e.g., straps) and a locking subsystem 615. Security buckle 605 is a latching and locking buckle that may be inhibited from unlatching by use of an interfering member, such as for example as described above in the context of FIG. 2 through FIG. 5. Securing subsystem is used to retain/control an object or access to an object or to a cavity within an object. In this particular exemplary case, securing subsystem 610 is a collar (or with use of optional buckle 620 a harness) for a pet such as for example a dog or a cat optionally including one or more security straps. As discussed above, it may be desirable to provide straps used in securing subsystem 610 with a tear/cut resistance construction such as inclusion of Kevlar or similar fibers, threads, and/or cables. Additionally special stitching or other configuration to prevent or inhibit removal of a strap end from coupling with buckle 605 (e.g., rivets, studs, or heat/chemical-processing to integrate the coupling) may be desirable.

Locking subsystem 615 may include a MicroSaver® lock as described above in the discussion of FIG. 2 through FIG. 5, or other similar system. Locking subsystem 615 includes an interfering member 625 (e.g., a T-bar and cooperating pin-plate or other similar system) a housing 630 supporting interfering member 625 and a locking system controlling transition of interfering member 625 between a first mode and a second mode responsive to a control (e.g., a key 635 or combination for a combination lock). In the first mode interfering member engages security buckle 605 as described above when buckle members are latched together. In the second mode, when so engaged, interfering member 625 operates to inhibit unlatching until interfering member 615 is transitioned to the first mode and, in some cases, disengaged from security buckle 605.

Locking subsystem 615 includes in some cases a localization feature (e.g., a security cable 640 terminating in a closed loop 645 sized so that the combination of interfering member 625 and housing 630 may pass therethrough. When cable 640 is wrapped around a second object OBJ, for example a tree or other difficult to move object) and housing 630 is passed through loop 645, locking subsystem 615 is localized (e.g., tethered) physically to second object OBJ. Engaging locking subsystem 615 to security buckle 605 thereby localizes system 600 to second object OBJ and therefore localizes the pet collared by securing subsystem 610 to second object OBJ as long as system 600 is so configured. Using key 635 provides further inhibition of unauthorized removal of the pet as the securing subsystem 610 may not be removed or delocalized until locking subsystem 615 is disengaged or system 600 is defeated. Thus system 600 provides a simple and efficient solution for pet owners that are required or desire to leave their pet unattended for short periods, such as when entering a retail or commercial location prohibiting pets.

It is often the case that collars (and harnesses) are provided including a certain degree of adjustment for neck/body circumference customization. A preferred mode for a security collar (or harness) is to provide for limited adjustment by allowing limited but moveable adjustment of one of the security straps. For example, one end of a security strap may be free and permit sliding through a strap coupler within a limited range so that different neck sizes may be accommodated as desired but a fully lengthened collar is sufficiently short not to slip over a head of the protected animal. One way to limit this range of motion is to have a sliding coupling system in which the free end is doubled over or otherwise adapted to not fit through the strap coupler.

Of course, when securing subsystem 610 is adapted for other objects, or access to objects, similar inhibition against delocalization or access to these other objects is possible and contemplated by the present invention. Such as, for example, the system shown in FIG. 7.

Figure 7:
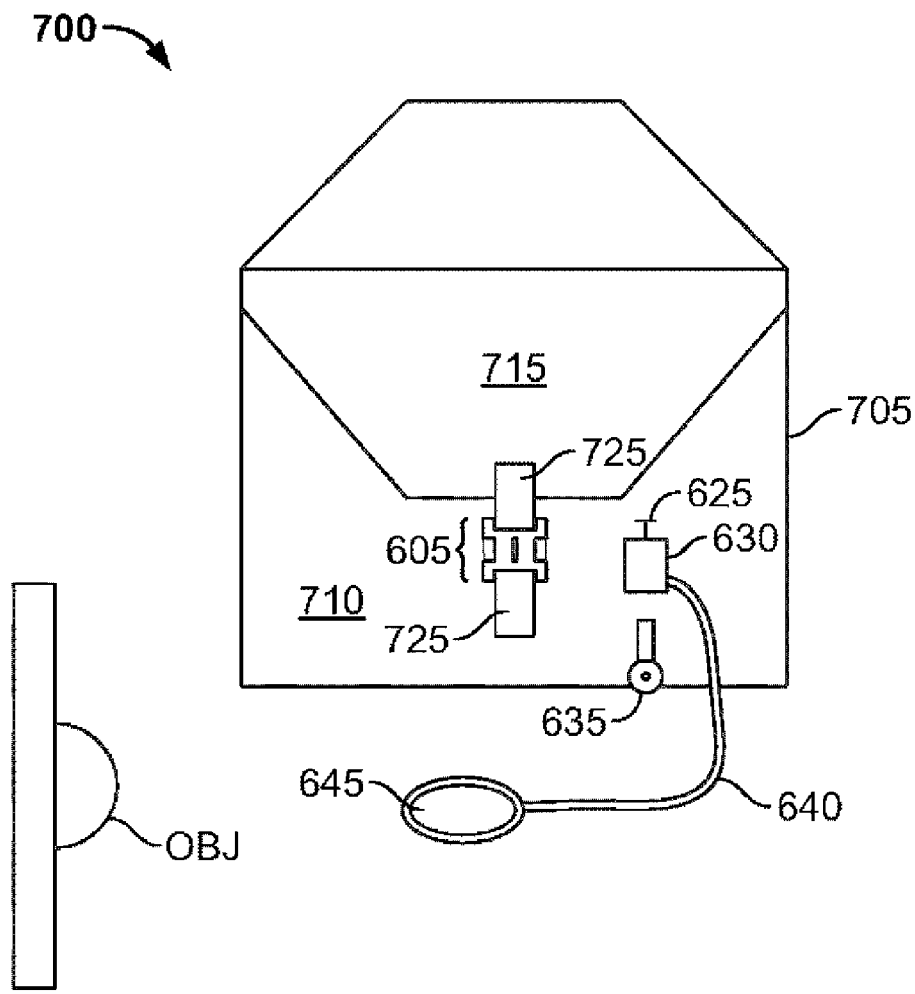
FIG. 7 is a representative plan view of a second aspect of the present invention incorporated into a security system.

FIG. 7 is a representative plan view of a second aspect of the present invention incorporated into a security system 700. System 700 includes security buckle 605 (shown and described in the context of FIG. 6) coupled to a securing subsystem 705 (e.g., a purse, bag, backpack, and the like) and locking subsystem 615 (also shown and described in FIG. 6). Security buckle 605 is a latching and locking buckle that may be inhibited from unlatching by use of an interfering member, such as for example as described above in the context of FIG. 2 through FIG. 5. Securing subsystem 705 is used to retain/control an object or access to an object or to a cavity within an object. In this particular exemplary case, securing subsystem 705 is a briefcase having a body 710 with walls defining an interior cavity for storing objects such as files, documents, and the like that is accessed through an opening. A flap 715 cooperates with body 710 for covering and closing the opening. In a preferred embodiment, contents of bag 710 are only accessible through the opening and only accessible through the opening when flap 715 is open. A first security strap 720 couples a portion of bag 710 to one operable body member of security buckle 605 and a second security strap 725 couples a portion of flap 715 to the other operable body member of security buckle 605. As discussed above, it may be desirable to provide the straps used in system 700 with a tear/cut resistance construction such as inclusion of Kevlar or similar fibers, threads, and/or cables. Additionally special stitching or other configuration to prevent or inhibit removal of a strap end from coupling with buckle 605 (e.g., rivets, studs, or heat/chemical-processing to integrate the coupling) may be desirable in some instances.

Locking subsystem 615 may include a MicroSaver® lock as described above in the discussion of FIG. 2 through FIG. 6, or other similar system. Locking subsystem 615 includes an interfering member 625 (e.g., a T-bar and cooperating pinplate or other similar system) a housing 630 supporting interfering member 625 and a locking system controlling transition of interfering member 625 between a first mode and a second mode responsive to a control (e.g., a key 635 or combination for a combination lock). In the first mode interfering member engages security buckle 605 as described above when buckle members are latched together. In the second mode, when so engaged, interfering member 625 operates to inhibit unlatching until interfering member 615 is transitioned to the first mode and, in some cases, disengaged from security buckle 605.

Locking subsystem 615 includes in some cases a localization feature (e.g., a security cable 640 terminating in a closed loop 645 sized so that the combination of interfering member 625 and housing 630 may pass therethrough. When cable 640 is wrapped around a second object OBJ, for example an eyehook or the like fixed to a wall of library or the like) and housing 630 is passed through loop 645, locking subsystem 615 is localized (e.g., tethered) physically to second object OBJ. Engaging locking subsystem 615 to security buckle 605 thereby localizes system 700 to second object OBJ and therefore localizes bag 710 and its contents by securing subsystem 705 to second object OBJ as long as system 700 is so configured. Using key 635 provides further inhibition of unauthorized removal of bag 710 or its contents as the securing subsystem 610 may not be removed or delocalized until locking subsystem 615 is disengaged or system 700 is defeated. Thus system 700 provides a simple and efficient solution for owners that are required or desire to leave their bag unattended for short periods, such as when accessing reference materials in a library or attending meetings in an office or standing in a queue at a delicatessen or the like.

It is often the case that containers are provided including a certain degree of adjustment for volume customization. A preferred mode for a security container is to provide for limited adjustment by allowing limited but moveable adjustment of one of the security straps. For example, one end of a security strap may be free and permit sliding through a strap coupler within a limited range so that different container volumes may be accommodated as desired but a fully expanded container is sufficiently closed to not permit access to the container contents when the flap is closed and latched. One way to limit this range of motion is to have a sliding coupling system in which the free end is doubled over or otherwise adapted to not fit through the strap coupler.

For young school children, it is not uncommon to have them use bookbags and bagpacks to move and store objects. As classrooms become full, having suitable space for all children to bring their bags into class becomes increasingly difficult. As a consequence, it is not uncommon for many reasons, including the space reason, to provide bag hooks outside the classroom to permit each child to hang the bag. A variation of the security system described herein provides a makeshift security system/portable locker system improving this situation by reducing a risk of theft or vandalism for the bags and bag contents left outside and relatively less supervised or unsupervised.

An array of eyebolts or other suitable engagement systems are disposed outside the classroom door. Each bag includes a security buckle, and selected other security features (e.g., cut-resistant straps, cut-resistant bag material and the like) to tether a bag to a particular eyebolt, and to secure the bag closed using a key or combination. Each child may access/move their bag while inhibiting theft or content vandalism by other. In some instances, it may be desirable to provide an admin masterkey or master combination to enable an administrator to move a bag and/or check and/or access contents of a bag. Thus the school need not invest in lockers or locker systems.

Figure 8:
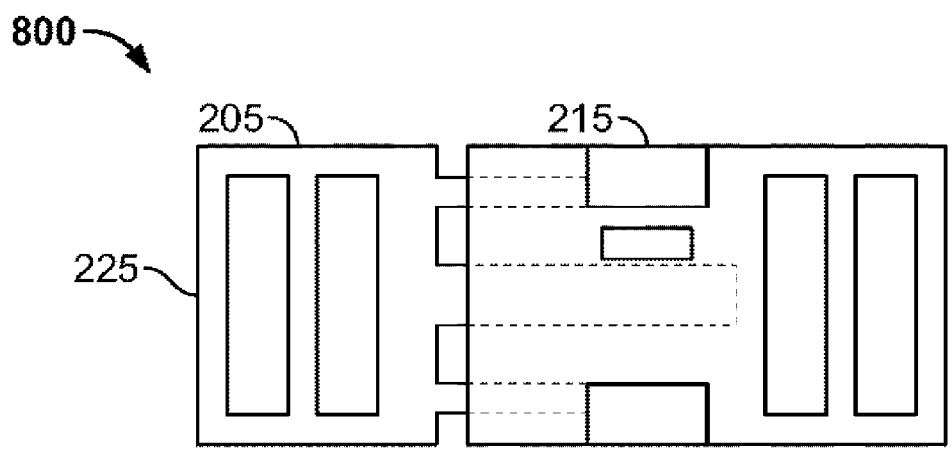
FIG. 8 is a representative plan view of a generic "snapped" embodiment.
Figure 9:
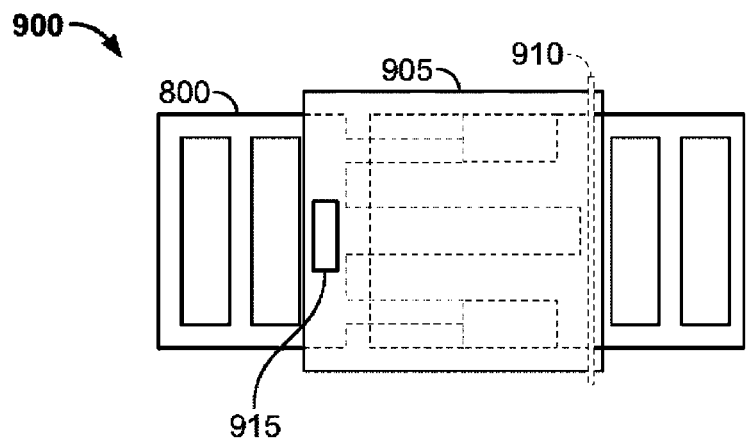
FIG. 9 is a representative plan view of an alternative embodiment for the present invention.

FIG. 8 is a representative plan view of a generic "snapped" embodiment 800 and represents any of the snap fastener (e.g., side, front, other buckle style) in a generic view. FIG. 9 is a representative plan view of an alternative embodiment for the present invention of a security buckle 900 interfacing with a modified version of the embodiment 800. Security buckle 900 includes a cover door 905 pivoting about an axis 910 and including a security slot 915. Many of the embodiments described above provide for a direct interference with the locking members, preventing or inhibiting operation of exposed locking members.

Buckle 900 is an alternative class of solution as it provides cover door 905 to prevent access to one or more locking members and thus the members may not be manipulated or operated to release the buckle. In buckle 900, cover door moves (e.g., swings about axis 910 though other systems may be used to hinge, slide, rotate, or reposition cover door between an exposing mode and a covering mode). FIG. 9 illustrates the covering mode wherein door cover 905 covers the locking members, preventing/inhibiting operation. The manner and degree to which door cover 905 covers or inhibits/prevents operation depends upon the desired degree of security and resource cost.

Door cover 910 includes security slot 915 which serves to hold cover door 905 in the covering mode and inhibiting movement to the exposed mode as long as an appropriate locking system engages security slot 915. Additionally, for solutions that desired localization, the locking system may include a localization tether which also maintains the buckle 900 (and any apparatus to which it is attached) localized based upon the localization system (cable, hard-tether, or electronic tether (alarm, motion detector, RFID tag/reader systems, and the like). As long as door 905 remains closed, buckle 900 is in the covered mode and buckle 900 remains latched and secured. Unlocking the locking system (e.g., removing the Microsaver product) from slot 915 enables buckle 900 to transition to the exposing mode and the locking arms may be operated to disengage the components of buckle 900.

As also described above, different latching systems suggest different door 905 configurations may be appropriate. Further, in some instances a latching system may be used to temporarily hold door 905 in place to inhibit transition of door 905 to the exposed mode (e.g., a thumbwheel or other element holding (without keyed (combo or key) locking) of door 905 in the covered mode. In some instances, slot may not be in cover door 905 but otherwise operable to inhibit transition from the covering mode to the exposing mode.

Figure 10:
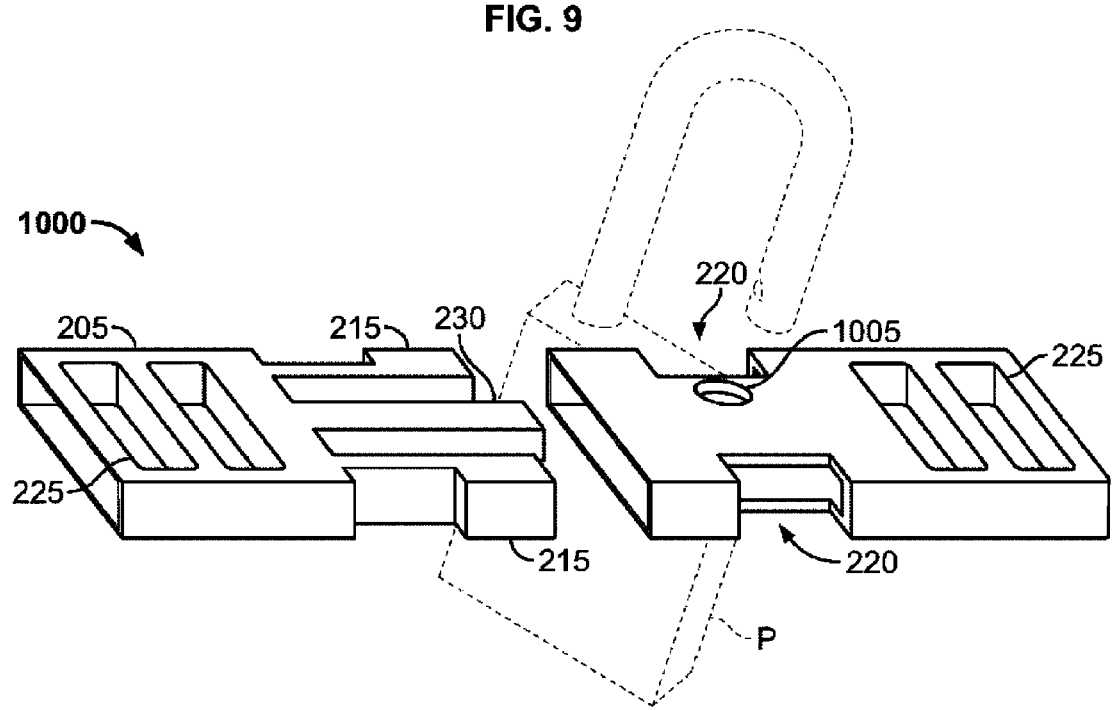
FIG. 10 is a representative perspective view of another preferred embodiment.

FIG. 10 is a representative perspective view of another preferred embodiment for a security buckle 1000.

Buckle 1000 is similar to buckle 200 shown in FIG. 2, with modifications. Buckle 1000 includes first body member 205 that mates to second body member 210 using pair of latching tabs 215 of member 205 to engage complementary mating slots 220 of member 210. Member 205 and member 210 may each include strap mounting slots 225 for attaching straps (not shown) in any number of conventional arrangements. Central guiding post 230 may optionally be included in some fashion as an aid in insertion of latching tabs 215 into member 210. Latching tabs 215 are springingly biased into the latching position so that latching tabs 215 may "squeeze" together during insertion yet positively latch into mating slots 220 to maintain member 205 in engagement with member 210 as long as latching tabs 215 engage mating slots 220. To disengage member 205 from member 210, latching tabs 215 are depressed towards each other (e.g., "squeezed") to disengage from mating slots 220 and to permit a user to retract member 205 from member 210. Additionally, member 210 is provided with an aperture sized to receive an interfering object (e.g., a shackle of a padlock P though virtually any suitable rigid object could be passed through aperture 1005) that extends into member 210 proximate one of latching tabs 215 (e.g., between one of tabs 215 and post 230. Interfering object P includes two modes—the first mode passes through aperture 1005 and the second mode is disengaged from buckle 1000. The first mode, particularly in the disclosed configuration when the interfering object is a shackle and the shackle is locked into the padlock, resists disengagement and also concurrently inhibits transition of the one latching tab 215 into the 'unlatched' position. Thus while the interfering object is engaged through aperture 1005 and in the first mode, the one latching tab 215 remains latched and member 205 may not be disengaged from member 210 absent damage or destruction of one of the components or portions thereof. In this embodiment, a chain or other object or a tethering system may also engage the shackle to provide a localizing system when necessary or desirable. Such as providing a substitute for the cable of the Microsaver® system discussed herein.

The design and construction of member 205 and 210 is adapted to resist damage and destruction that could permit disengagement of member 205 from member 210. The materials selected and design configuration and interactions are adapted to not be easily deformed, damaged, or destroyed. While virtually no system is destruction-proof, emphasizing materials and design to resist reasonable (within constraints and design parameters of the particular application) torquing, crushing, pulling, compressive, tension, and/or shearing forces enhances security up to the design limits. For example, special crush and tear-resistant plastics and design may be used in the construction. An additional concern for enhancing security could be addition of composites or fibers to prevent deformation and damage to aperture 1005 and thereby inhibit premature removal of the interfering object.

While it is contemplated that there may be many different types and configurations of acceptable interfering objects, with aperture 1005 adapted appropriately, a preferred embodiment is use of a padlock (keyed or keyless including biometric locking systems), or equivalent.

A further design configuration of a security system using buckle 1000 is, when configured for use with straps, is to provide the straps to also resist detaching or destruction by torquing, shearing, compressing, and/or tension forces. For example, use of tear and cut-resistant Kevlar (or other composite) fibers in the straps or the like and secure coupling of the straps to slot engagement slots 225 may be appropriate. Note that in some systems, buckle 1000 may be employed in a security embodiment using a coupling system that does not include straps and the coupler mechanism 225 would be adapted or removed as appropriate.

Figure 11:
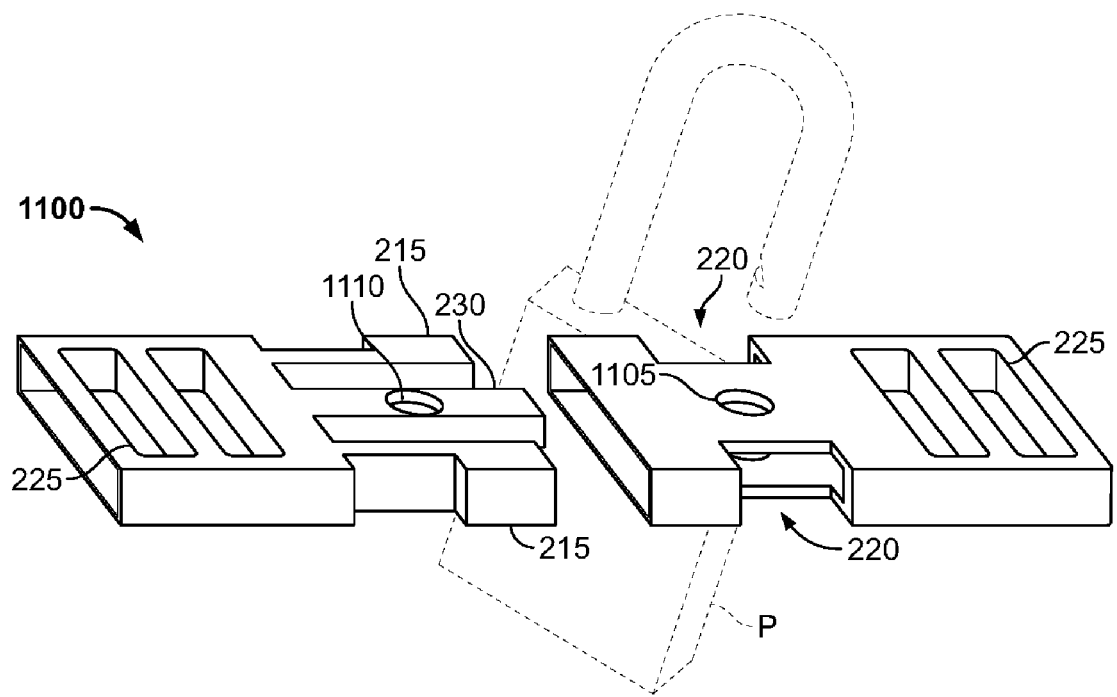
FIG. 11 is a representative perspective view of a variation of the preferred embodiment shown in FIG. 10.

FIG. 11 is a representative perspective view of a security buckle 1100 being a variation of buckle 1000 shown in FIG. 10. Buckle 1100 includes a different placement for an aperture 1105 in member 210. Aperture 1105 is centrally positioned to match an aperture/hole/slot 110 in guidepost 230. Aperture 1105 and aperture 1110 have co-axial elements when the two buckle portions are "snapped" together (e.g., engaged) in the locking position. An interfering member (e.g., a shackle of a padlock P or the like) is passed through the aligned apertures 1105 and 1110 and resist separation of the buckle portions as long as such condition exists. In this scenario, it is not required that the latching system be inhibited from de-latching as the interfering object maintains the latching status of the buckle portions. As long as the interfering object is passed through the aligned aperture, security buckle 1100 remains locked. Like the embodiment shown in FIG. 10, a cable, tether, or other localizing system may be incorporated, integrated, or used in cooperation with the interfering object to localize a locked security buckle 1100 to another object as disclosed herein.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. In some cases, the security buckles described may be incorporated into child safety harnesses to inhibit the child from self-releasing the fastening system prematurely. The embodiments shown and described above, such as solutions without the tether, may be used, for example, in the child seat harnesses while with a tethering sub-system may be appropriate, for example, for use in child walking harnesses.

In some cases, the embodiments or claims have used a term "slot" which is not taken to be limited to (unless the context clearly indicates otherwise) a non-round aperture 3 mm×7 mm generally rectangular slot. Other slot shapes (including circular apertures) are possible in some circumstances.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A security release buckle, comprising:
a first body member having one or more walls defining a receiving cavity and one or more mating slots; and
a second body member adapted to engage said receiving cavity, said second body member including one or more latching tabs for engaging said one or more mating slots wherein said second body member is inhibited from disengagement while said one or more latching tabs engage said one or more mating slots, and wherein said first body member includes a portion of said one or more walls defining a security slot adapted for receiving an interfering object that includes an engagement mode for insertion and removal from said slot and an interfering mode for inhibiting said one or more latching tabs from disengaging from said one or more mating slots until said interfering object is transitioned to said engagement mode.

2. The buckle of claim 1 wherein said body members include structural composite fillers for enhancing resistance to engagement failures due to torsion, compression, tension, and shearing of one or more component.

3. The buckle of claim 1 further comprising:
   one or more strap engagement couplers included with each body member; and
   a security strap coupled to each strap engagement coupler.

4. The buckle of claim 3 wherein said security strap includes lengthwise anti-shear fibers.

5. A buckling method, the method comprising:
   a) engaging a first body member having one or more latching tabs into an engagement receiving cavity of a second body having one or more mating slots compatible with said one or more latching tabs wherein said first body member remains engaged with second body member until said one or more latching tabs disengage said one or more mating slots; and
   b) interfering with said disengagement of said one or more latching tabs from said one or more mating slots to inhibit disengagement of said first body member from said second body member wherein said interfering step includes inserting an object into said second body wherein insertion of said object inhibits disengagement as long as said object remains inserted into said second body.

* * * * *